United States Patent [19]

Hoffman et al.

[11] Patent Number: 4,823,062
[45] Date of Patent: Apr. 18, 1989

[54] METHOD AND APPARATUS FOR PRECISION CONTROL OF LINEAR MOTORS AND THE LIKE EMPLOYING A CLOSED LOOP TECHNIQUE

[75] Inventors: Brian D. Hoffman, Somerville, N.J.; Stephen H. Pollack, Washington Crossing, Pa.

[73] Assignee: Megamation, Incorporated, Princeton, N.J.

[21] Appl. No.: 77,112

[22] Filed: Jul. 23, 1987

[51] Int. Cl.$^4$ .............................................. G05B 11/00
[52] U.S. Cl. ..................................... 318/687; 318/135; 250/237 R; 340/710
[58] Field of Search .............................. 318/687, 135; 250/237 R; 340/710

[56] References Cited

U.S. PATENT DOCUMENTS

| | | | |
|---|---|---|---|
| 3,735,231 | 5/1973 | Sawyer | 318/687 |
| 4,364,035 | 12/1982 | Kirnch | 340/710 |
| 4,390,873 | 6/1983 | Kirnch | 340/710 |
| 4,546,347 | 11/1985 | Kirnch | 340/710 |

Primary Examiner—William M. Shoop, Jr.
Assistant Examiner—Saul M. Bergmann
Attorney, Agent, or Firm—Louis Weinstein

[57] ABSTRACT

A two-dimensional linear motor is provided with sensors respectively capable of detecting only the x and y grid lines arranged in a platen traversed by the linear motor. These signals are accumulated and their counts are compared against the respective x and y distances the linear motor is to be moved in order to move the linear motor to the precise position desired and/or to verify that the desired movement has been accomplished. Differentiation of the mutually orthogonal sets of grid lines is accomplished by providing the grid lines with reflective surfaces which have different reflectivity characteristics or alternatively have a different reflectivity characteristics at with appropriate evaluation devices such as filters or threshold circuits which differentiate between either different wavelengths or different reflectivity characterisitics. The orthogonal grid lines may alternatively be formed upon a transparent sheet which has openings to receive the teeth of the platen whereby the grid lines are positioned within the grooves which are formed in the platen.

18 Claims, 8 Drawing Sheets

METHOD AND APPARATUS FOR PRECISION CONTROL OF LINEAR MOTORS AND THE LIKE EMPLOYING A CLOSED LOOP TECHNIQUE

FIELD OF THE INVENTION

The present invention relates to linear motor systems and more particularly to method and apparatus for operating linear motors by providing a closed loop system in which movement of the linear motors is precisely controlled.

BACKGROUND OF THE INVENTION

Linear motors are well known to the robotics art and are typically moved across a cooperating surface referred to as a platen. Two dimensional linear motors comprise first and second stepping motors to provide movement of the linear motor in mutually perpendicular directions, each stepping motor comprising a moving member or "forcer" which traverses a cooperating platen.

The forcer is magnetically propelled along the working surface of the platen. One typical two-dimensional forcer is the dual access X-Y motor produced by Xynetics products of Santa Clara, Calif. Magnetic propulsion is accomplished by selectively controlling the power provided to a plurality of electromagnets arranged within the forcer. The electromagnets magnetize themselves to teeth defined by a grid array machined into the working surface of the platen and comprised of a plurality of first and second groups of uniformly spaced parallel lines with the groups of lines being mutually orthogonal so as to define a regular grid matrix. The grid array grooves are preferably filled with a suitable insulating material, said grooves being formed in the surface of a ferromagnetic material or alternatively of material capable of concentrating magnetic lines of force.

In order to move two-dimensional linear motors from one position to another so that the linear motor arrives and is positioned precisely at the desired location, it is important to provide a system and/or technique in which the positioning of the linear motor is insured through a closed loop system. To date, no such closed loop system exists for accurately controlling the movement of two-dimensional linear motors.

A system presently exists which is capable of differentiating between two sets of mutually perpendicular grid lines. Each set comprises a plurality of spaced parallel lines with the two sets being of different colors. The light from a pair of sources is reflected to a pair of cooperating sensors each adapted to recognize signals of different wavelengths representing the colors of the two sets of mutually perpendicular lines. These signals are utilized to create a display upon a display means such as a CRT display of a computer monitor.

However, there are no devices capable of providing an indication that the requested movement has taken place or for providing means for accurately controlling movement through a feed back loop.

BRIEF DESCRIPTION OF THE INVENTION

The present invention is characterized by comprising method and apparatus for accurately moving and positioning two-dimensional linear motors in any desired position upon a platen through the use of a closed loop system and technique.

The linear motor is provided with first and second sensors each capable of detecting the passage of the grid lines provided in the platen. These grid lines or grooves are treated or otherwise formed so as to have different reflectivity characteristics. For example, the parallel grid lines extending in a first direction may be provided with a reflectivity characteristic which is greater than the reflectivity characteristic of the grid lines which are perpendicular thereto.

The linear motor is provided with first and second sets of sensor/lamp source combinations. The sensor detecting the grid lines having the lower reflectivity characteristic is provided with threshhold circuitry functioning so that only grid lines of the lower reflectivity characteristic will cause the first sensor to generate a signal as the sensor passes each such grid line. The sensor of the remaining sensor/lamp combination is provided with a threshold circuit which passes only signals greater than a predetermined threshhold to assure that signals will be generated only when passing grid lines of the higher reflectivity.

The differentiated signals are accumulated in a counter and compared against the count representing the respective x and y distances which the linear motor is to be moved and, upon comparison, the stepping of the stepper motors is terminated, thus providing accurate positioning of the linear motor as well as providing a system for distinguishing between the mutually perpendicular grid lines.

In still another technique, the grid lines may be filled with an insulation material which is admixed with a pigment or is painted or otherwise is coated with a colored paint or material. The x and y grid lines are made of different colors which are preferably chosen so that their wavelength ranges are sufficiently separated from one another to facilitate identification thereof by the sensor means, each of which is preferably provided with a filter for passing light within the wavelength range of the filter.

The number of grid lines crossed is accumulated in counter means, for example, and the count is compared with the desired amount of movement which may likewise be in the form of a digital count representative of the distance travelled, whereupon operation of the associated stepper motor is terminated, thus providing a closed loop system for accurate positioning of the linear motor and also having the capability of differentiating between the mutually perpendicular sets of grid lines.

OBJECTS OF THE INVENTION AND BRIEF DESCRIPTION OF THE FIGURES

It is therefore one object of the present invention to provide a closed loop system for accurately controlling the movement of linear motors and the like.

Still another object of the present invention is to provide a closed loop system for controlling the accurate movement of two-dimensional linear motors through the utilization of mutually perpendicular sets of grid lines within the cooperating platen which grid lines have different light reflection characteristics and wherein the cooperating sensors are provided with evaluation means for differentiating between movement over such grid lines to further enhance the operation and accuracy of the closed loop controlled system.

The above as well as other objects of the present invention will become apparent when reading the accompanying description and drawing in which:

FIG. 1b shows a perpestive view of a pair of forcers of the type shown in FIG. 1a.

DETAILED DESCRIPTION OF THE INVENTION AND THE PREFERRED EMBODIMENTS THEREOF

Figure 1:
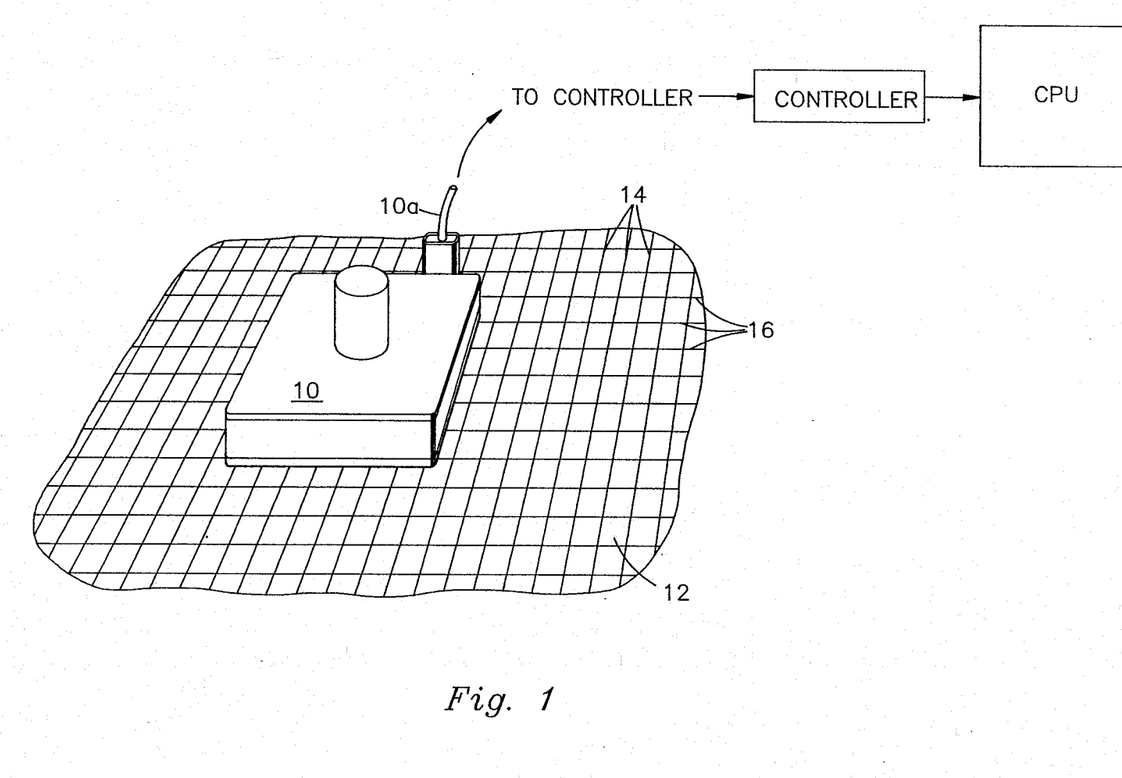
FIG. 1 shows a simplified view of a linear motor system which may utilize the method and apparatus of the present invention to great advantage.

FIG. 1 shows a simplified perspective view of a linear motor 10 movable along a platen 12 having mutually perpendicular sets of grid lines 14 and 16 which are formed or machined into the platen surface in order to define a regular matrix of teeth which cooperate with the mutually perpendicular forcers shown in FIG. 1c to move the linear motor along the surface of platen 12.

Figure 1A:
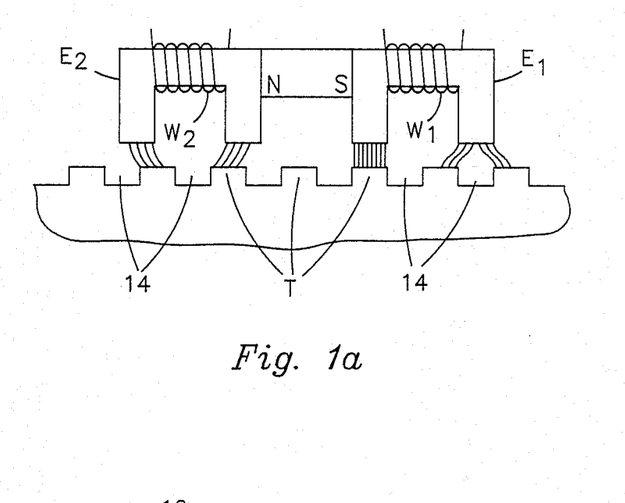
FIG. 1a is a schematic view showing the manner in which a forcer of the linear motor system of FIG. 1 cooperates with a platen.
Figure 1B:
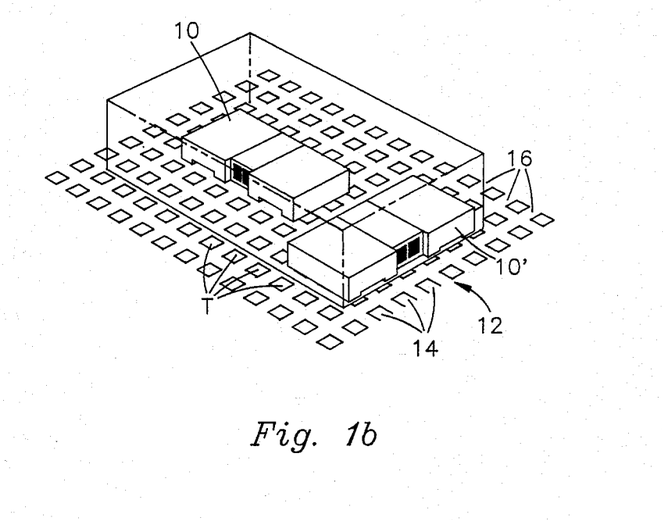

Each of the mutually perpendicular forcers 10' and 10" shown in FIG. 1b, comprise electromagnets shown in FIG. 1a which receive sine wave currents that are out of phase with respect to one another and which are applied to the windings W1 and W2 of the electromagnets E1 and E2 of FIG. 1a. The phase difference is preferably a multiple of 90°.

The forcer moves by one tooth pitch (typically 0.040 inches) each time the drive current is rotated through 360°. The current applied to each forcer is advanced or retarded in discrete steps, referred to as "micro steps". Given that there are 400 micro steps per pitch, in one preferred embodiment, the motion is effectively continuous. The teeth T of the platen are defined by the sets of grid lines or grooves 14 and 16.

Frictionless operation is realized through the use of air introduced through main cable 10a, together with the other electrical connections, which flows out of tiny openings along the bottom surface of the linear motor adjacent to the platen surface to form a film of air which allows the linear motor to "float" above the platen. Ball bearings may be utilized as an alternative to the air technique, if desired.

The commands are provided to the forcers by the central computer CPU and are provided in the form of position, velocity and acceleration data which is interpretated by the controller and relates to the drive electronics for conversion into analogue waveforms.

The dual access linear motor cooperates with platen 12 having two sets of grid lines 14 and 16 in order to form an orthogonal matrix of teeth T. The forcers 10' and 10" are arranged within the linear motor at right angles to each other and can therefore be moved over a large platen surface following any desired trajectory.

Figure 2:
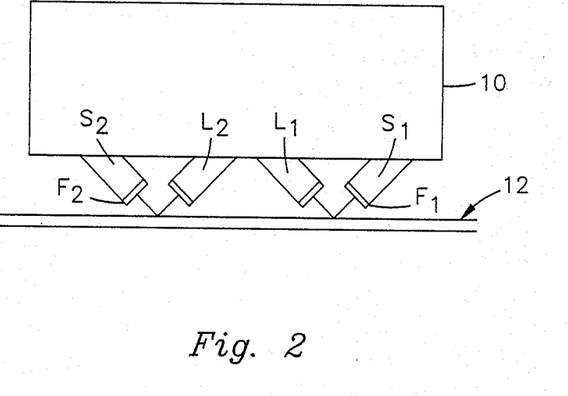
FIG. 2 shows an elevational view of the sensor employed in the closed loop system of the present invention.

The sensor assemblies as shown in FIG. 2 are arranged in or along one surface of the linear motor 10 and are positioned above the surface of platen 12. Each sensor assembly is comprised of a light source L1, L2 and a sensor S1, S2. The sensor/light source combinations may be arranged in mutually perpendicular alignment as shown in the top plan view of FIG. 2a.

Figure 2A:
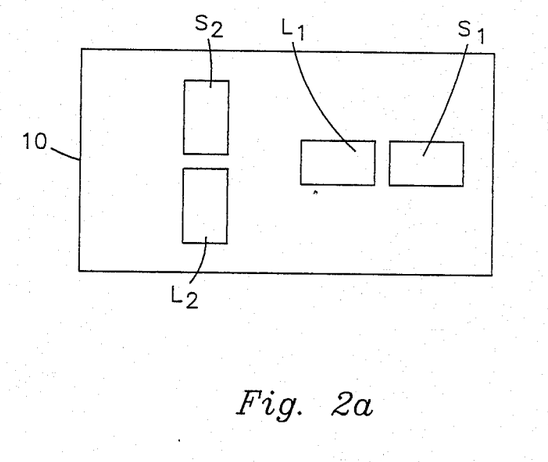
FIG. 2a shows a plan view of the sensors of FIG. 2.

The light from each light source L1, L2 is directed downwardly and at an angle toward the platen surface, is reflected therefrom at a similar angle and is picked up by the associated sensors S1, S2. In the embodiment in which the grid lines reflect light of different wavelengths, each sensor respectively is provided with a filter F1, F2 for filtering out light of all wavelengths except the wavelength which is passed by the filter. For example, the grid lines 14 may be red in color while the grid lines 16 may be blue in color. The filters F1 and F2 are respectively designed to pass only red and blue light thus assuring that each sensor will detect the passage of only one of the sets of grid lines 14 and 16, to the exclusion of the other. Another reflectivity may be employed as an alternative, as will be discussed hereinbelow.

Figure 4:
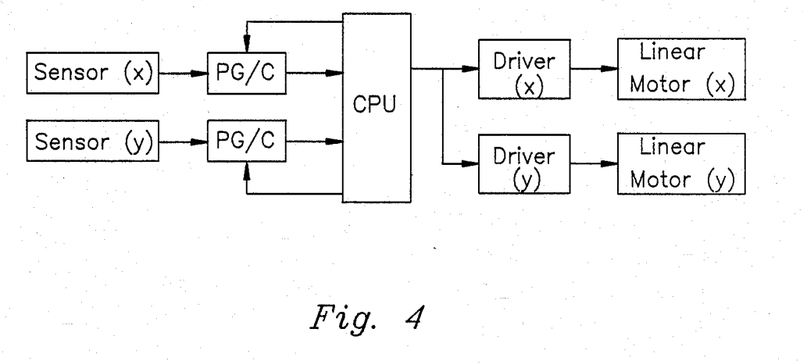
FIG. 4 shows a simplified block diagram of the electronics control system employed in the present invention.

As shown in FIG. 4, the sensor signals are coupled through a pulse generator or suitable wave shaping circuit to apply each such pulse to a counter. The counters are initially reset prior to initiating movement and are thereafter periodically examined by the CPU to ascertain the count. The CPU continues to provide the appropriate information to the x and y driver circuits which in turn operate the x and y forcers of the linear motor 10. When the requisite number of steps have been accumulated, the CPU terminates the signals to the driver circuits.

Figure 5:
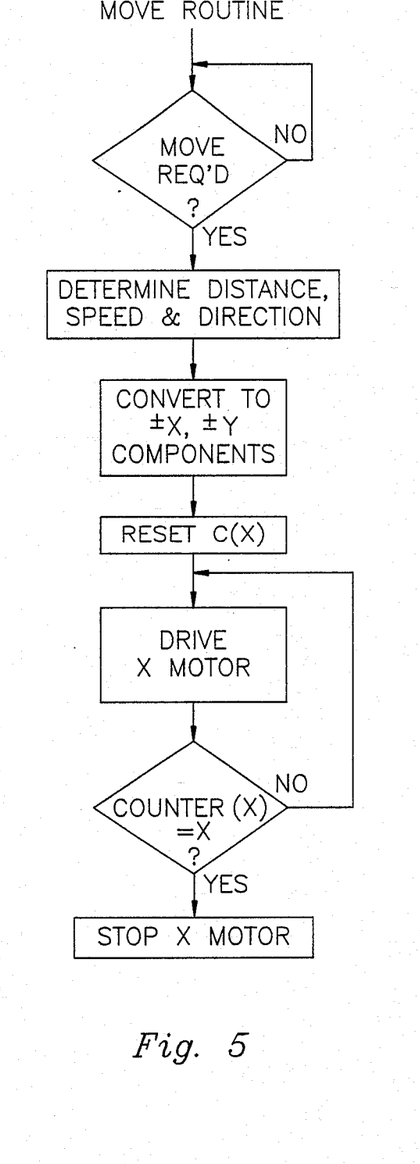
FIG. 5 shows a flow diagram of the steps performed to accurately control movement of the linear motor.

As shown in the flow chart of FIG. 5, when a move is requested the distance, direction, acceleration and speed is determined and is converted into the appropriate data for the x and y forcers. The counters are cleared, the motor is driven and a comparison is made of the state of the x counter, for example, with the x distance to be travelled and upon a comparison with an affirmative outcome, the x motor is stopped. The y motor operation is performed in a similar manner.

Figure 3A:
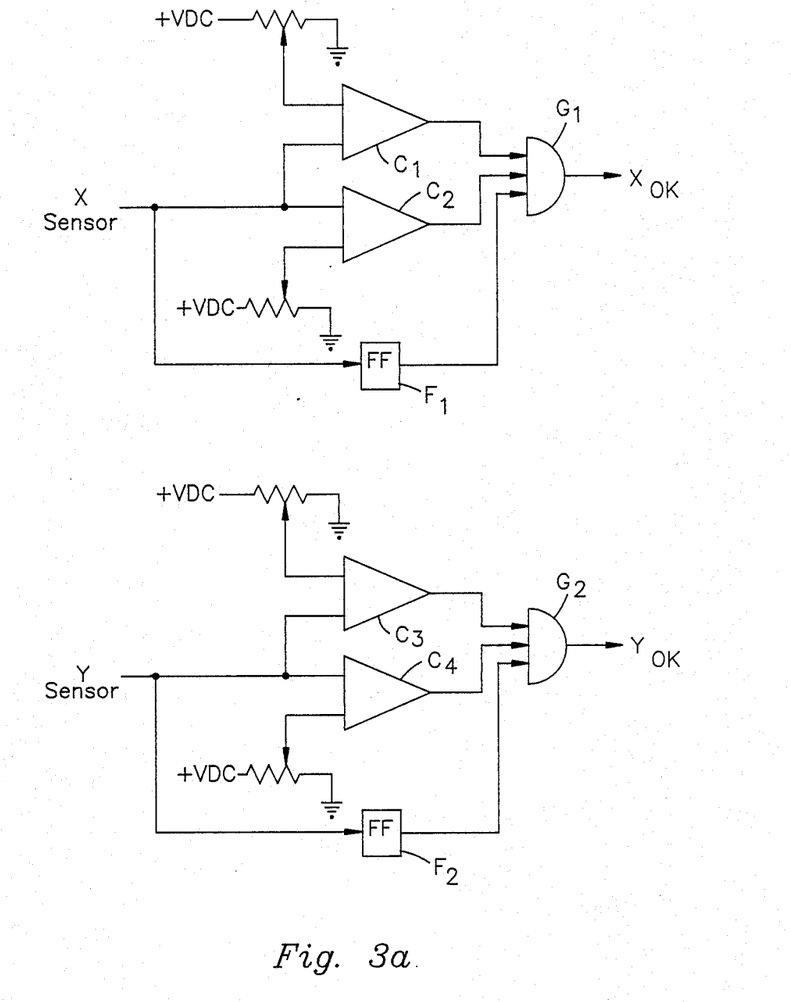
FIGS. 3a and 3b show evaluation circuitry employed with the sensors for identifying the passage of grid lines associated with each sensor.

Considering FIG. 3a, a circuit is provided therein for differentiating between grid lines having two different reflectivities. As the light from one of the light sources, for example, L1 is reflected from a grid line, the difference in reflectivity between the surface of each of the teeth T and the grid line causes an abrupt change in signal strength setting flip flop F1 to provide an enable signal to gate G1 during the time that light is reflected from a grid line. The signal is further compared against a lower threshhold in comparator C1 and against an upper threshhold in comparator C2. This design presupposes that the grid lines detected by the "x" sensor have a lower reflectivity than the grid lines detected by the "y" sensor. If the signal strength lies between the lower and upper threshholds, gate G1 is enabled to produce a signal indicative of the passage of an x grid line.

The y sensor signal is compared against a lower threshhold which is preferably substantially equal to the upper threshhold of comparator C2. An upper threshhold level is compared against the signal from the y sensor by comparator C4 to differentiate between the reflectivity of a grid line and the reflectivity of the surface of a tooth. As the light is reflected from a grid line, flip flop F2 is set to enable gate G2. If the signal lies between the two threshholds, gate G2 is enabled to provide a signal indicative of the fact that a "y" grid line has been detected.

Figure 3B:
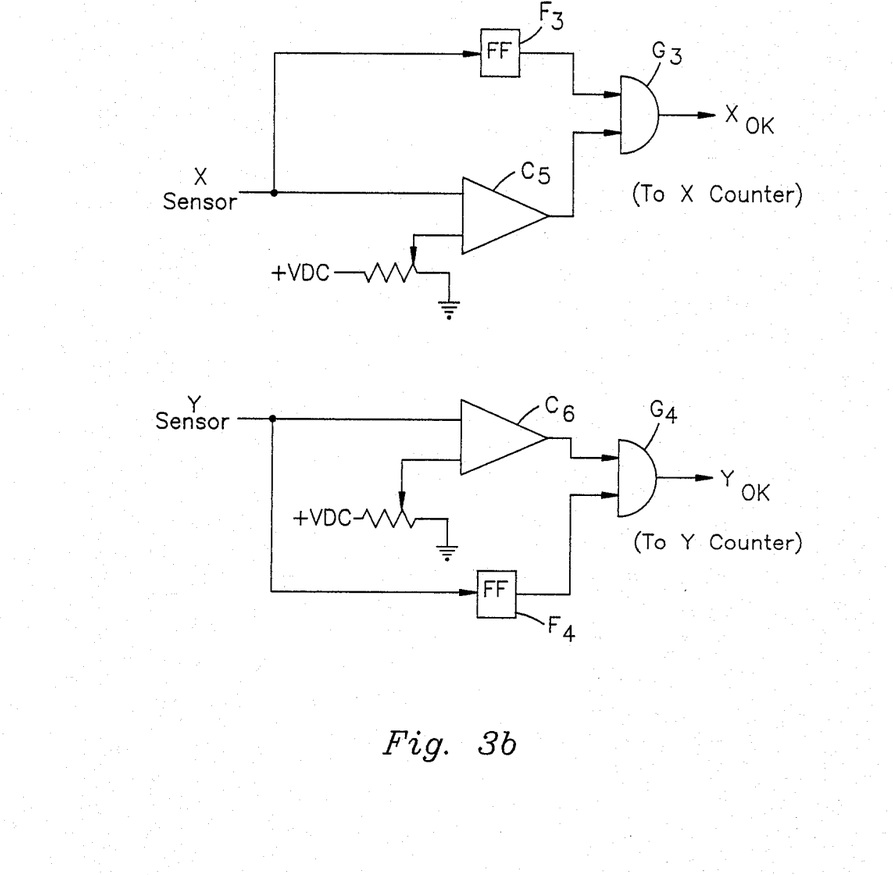

In the embodiment of FIG. 3b, in which the grid lines are of different colors, only one threshhold level need be provided for each sensor. Thus, the "x" signal generated by the "x" sensor is compared against a lower threshhold level. The "x" sensor signal also sets flip flop F3 each time a grid line is crossed, enabling gate G3. If the signal strength surpasses the threshhold level, a signal indicating the passage of an "x" grid line is generated. A similar arrangement is utilized for the y sensor and employs comparator C6 and AND gate G4 of flip flop F4. The comparator circuitry employed in the embodiment of FIG. 3b is simplified due to the use of grid lines of different colors and the use of filters in conjunction with each of the sensors to pass light of only one narrow wavelength range which coincides with the color of one of the sets of the sensor grid lines, thus providing a color differentiation as opposed to a reflectivity differentiation.

Figure 6A:
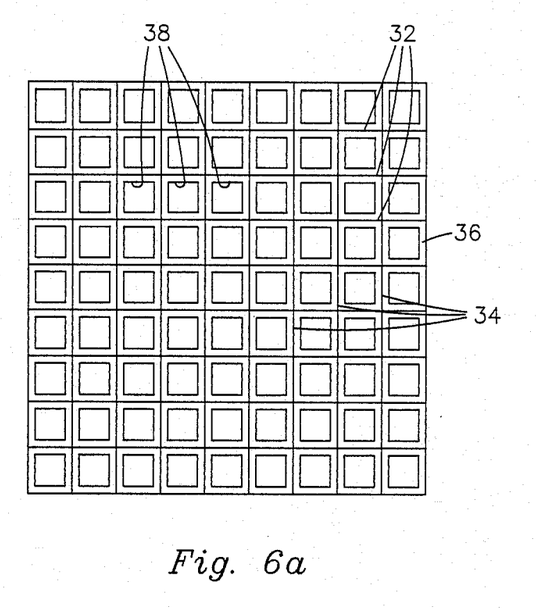
FIGS. 6a and 6b show top plan view and elevational views of a grid arrangement for use with the apparatus of FIG. 1.
Figure 6B:
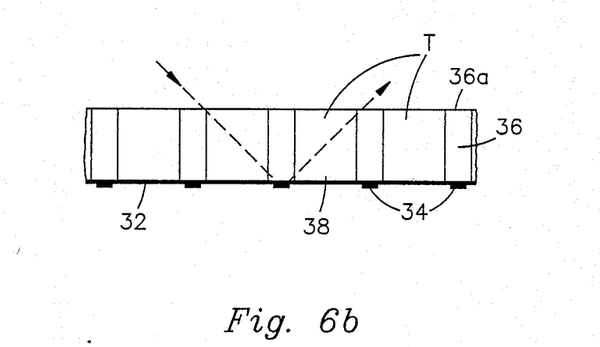

The present invention may also take advantage of the technology of Mouse Systems Corporation which is comprised of mutually perpendicular sets of grid lines 32 and 34 formed on a transparent plastic sheet 36 as shown in FIGS. 6a and 6b. The grid lines are formed of a translucent ink.

The light is directed diagonally downwardly, passing through transparent film 36 and the grid lines, the light is reflected from a reflective surface 38 and again passes through the grid line and impinges upon a light sensing element provided with an appropriate filter. Since the grid lines are translucent, light at an intersection between a black grid line 32 and blue grid line 34 will contain light of both wavelengths. However, only one of the wavelengths will be accepted dependent upon the filter cooperating with the sensor upon which the light impinges. This arrangement assures that meaningful signals are generated even at intersections between the blue and black grid lines.

The grid pattern of FIGS. 6a and 6b may be employed in the present invention by cutting openings 38 as shown, for example, in FIG. 6a each just slightly greater in size than the teeth T shown in FIG. 1b, for example, in order to permit the sheet-like member of FIGS. 6a and 6b to be placed directly upon the platen shown in FIG. 1b thereby providing a top surface which is defined by the top surfaces by each of the teeth T as well as the top surface 36 of transparent sheet 36. This alternative arrangement avoids the need to fill each of the grooves with insulating material and for coloring insulating material or at least coloring the top surfaces thereof, to obtain the sets of mutually perpendicular grid lines of different colors.

Since the grid lines are formed on the bottom surfaceof transparent sheet 36, the sheet serves as a means to protect the grid lines against wearing. In all other respects, the system of the present invention functions in the same matter as was described hereinabove when employing the grid line assembly of Mouse Systems Corporation described hereinabove.

The reflectivity differences may be dependent upon differences in contrasting colors such as black and white or contrasts in the texture of the surfaces such as highly reflective, highly polished surfaces versus a textured or matted surface having a significantly reduced reflectivity as compared with a highly polished surface.

The present invention thus makes it possible to detect the movement undertaken by a linear motor to assure advancement of the linear motor through the appropriate distance, as well as providing means for assuring precise movement of a linear motor through the feedback system described hereinabove. Thus, it is possible to provide step verification at least to the accuracy of 40,000th of an inch, as well as being usable as part of a close loop feedback system to control movement.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention here.

We claim:

1. Apparatus for accurately verifying the movement of linear motors and the like, said linear motors having first and second forcer means, said controlling means comprising:

a platen formed of a plate of magnetic material having first and second sets of parallel, uniformly spaced grid lines formed in the platen surface for defining an orthogonal matrix of teeth whose surfaces are exposed to said forcer means;

said grid lines having differing reflectivity characteristics;

first sensor means arranged on said linear motor for detecting said grid lines including means for generating a signal indicative of the presence of a grid line of only one of said sets of grid lines to the exclusion of the remaining one of said sets;

second sensor means for generating a signal representing the passage of a grid line and including means for detecting the passage of only the remaining ones of said grid lines to the exclusion of said first set of said grid lines, said first and second sensor means each comprising a light source and a sensing element, each light source directing light diagonally toward said platen and each element being disposed to receive light reflected diagonally from the platen;

said first sensor means being arranged so that the alignment of said first sensor means is substantially orthogonal to the alignment of the second sensor means; and control means receiving signals from said first and second sensor means for terminating movement of the first and second forcer means when the counts of said sets of grid lines reach a predetermined value.

2. The apparatus of claim 1 further comprising means for generating signals representative of the distance and direction said linear motor is moved; and means responsive to said signals and the data controlling the movement of said linear motor for terminating movement of said linear motor when the number of grid lines counted compares with the distance controlled data.

3. The apparatus of claim 1 wherein one of said sets of grid lines has a reflectivity greater than the reflectivity of the remaining one of said sets of grid lines.

4. The apparatus of claim 2 wherein the evaluation means of each of said sensors further comprises threshhold means for limiting the passage of signals of only one of said sets of grid lines to the exclusion of the other.

5. The apparatus of claim 1 wherein said first and second sets of grid lines have characteristics such that they reflect light of different wavelengths;

each of said sensors including filter means for passing only one of said wavelengths to the exclusion of the other.

6. The apparatus of claim 5 wherein said grid lines are of different colors and said filters are respectively adapted to pass light of the particular color of an associated one of said sets of grid lines.

7. The apparatus of claim 5, wherein said grid lines reflect light of first and second different predetermined wavelength ranges;
   each of said filters respectively passing light of said first and second wavelength ranges.

8. The apparatus of claim 7, wherein said first and second wavelength ranges are non-overlapping.

9. A method for operating a dual axis linear motor along the surface of a platen having mutually perpendicular sets Serial No. 077,112 of grid lines for forming an orthogonal matrix of teeth cooperating with the first and second mutually perpendicular forcer means of said linear motor, said method comprising the steps of:
   providing one of said sets of grid lines with a reflectivity characteristic which is different from the reflectivity characteristic of the remaining one of said sets of grid lines and so that the directions of the light beams are substantially orthogonal to one another;
   directing first and second light beams from said linear motor toward the surface of said platen containing said grid lines;
   receiving the light beams reflected from said platen surface at two independent locations; and
   generating a grid line passage signal for each light beam only when the reflected light falls within a predetermined range of signal strength for each light source, said threshhold ranges being non-overlapping to differentiate between the two sets of orthogonal grid lines.

10. The method claim of claim 9 wherein said first and second sets of grid lines are different colors; and
   the reflected beams are filtered to pass light of only one wavelength range in order to differentiate between said first and second sets of different color grid lines.

11. The method of claim 9, wherein the first and second sets of grid lines reflect light of only a narrow wavelength range; and
   the reflected beams are each filtered through filters passing light in only one of said wavelength ranges to differentiate between said sets of grid lines.

12. The apparatus of claim 1 further comprising means for comparing the signals generated by said sensor means with signals representing the distance the linear motor was requested to move for verification that the linear motor has moved the desired distance.

13. Apparatus for accurately verifying the movement of linear motors and the like, said linear motors having first and second forcer means, said controlling means comprising:
   a platen formed of a magnetic material and having first and second sets of parallel, uniformly spaced grooves formed in the platen surface for defining an orthogonal matrix of teeth;
   first sensor means arranged on said linear motor for detecting said grid lines and including means for generating a signal indicative of the presence of a grid line of only one of said sets of grid lines to the exclusion of the remaining one of said sets;
   second sensor means for generating a signal representing the passage of only the remaining ones of said grid lines to the exclusion of said first set of said grid lines; Serial No. 077,112
   a transparent sheet having first and second sets of uniformly spaced parallel grid lines formed on one surface of said transparent sheet and being perpendicular to one another, the spacing between the grid lines of said first and second sets being respectively substantially equal to the spacing between the grooves provided in said platen;
   said first set of grid lines being of a different color than said second set of grid lines;
   said sheet being provided with openings each bound by a pair of said first set of grid lines and a pair of said second set of grid lines, each opening being of a shape and size sufficient to each receive an associated one of said platen teeth so that the top surfaces of said teeth as well as the exposed surface of said transparent sheet collectively form the top surface of said platen assembly.

14. The apparatus of claim 13 wherein said grid lines are formed of a colored ink.

15. The apparatus of claims 14 wherein said colored ink is a translucent ink.

16. The apparatus of claim 13 wherein the grid lines are formed on the surface of said transparent sheet which extends downwardly into the grooves of said platen.

17. The method of claim 9 further comprising the steps initially controlling the movement of said first and second forcer means in a first manner to move the linear motor and controlling the first and second forcer means in a second manner when the counts of said first and second grid lines respectively reach predetermined values.

18. A platen for use with linear motors formed of a magnetic material and having first and second sets of parallel, uniformly spaced grooves formed in the platen surface for defining an orthogonal matrix of teeth; Serial No. 077,112
   a transparent sheet having first and second sets of uniformly spaced parallel grid lines formed on one surface of said transparent sheet and being perpendicular to one another, the spacing between the grid lines of said first and second sets being respectively substantially equal to the spacing between the grooves provided in said platen;
   said first set of grid lines being of a different color than said second set of grid lines;
   said sheet being provided with openings each bound by a pair of said first grid line and a pair of said second set of grid lines, each opening being of a shape and size sufficient to each receive an associated one of said platen teeth so that the top surfaces of said teeth as well as the exposed surface of said transparent sheet collectively form the top surface of said platen assembly.

* * * * *